Dec. 4, 1945.  J. D. BEEBE  2,390,290
RESILIENT WHEEL CUSHION
Filed Aug. 1, 1942
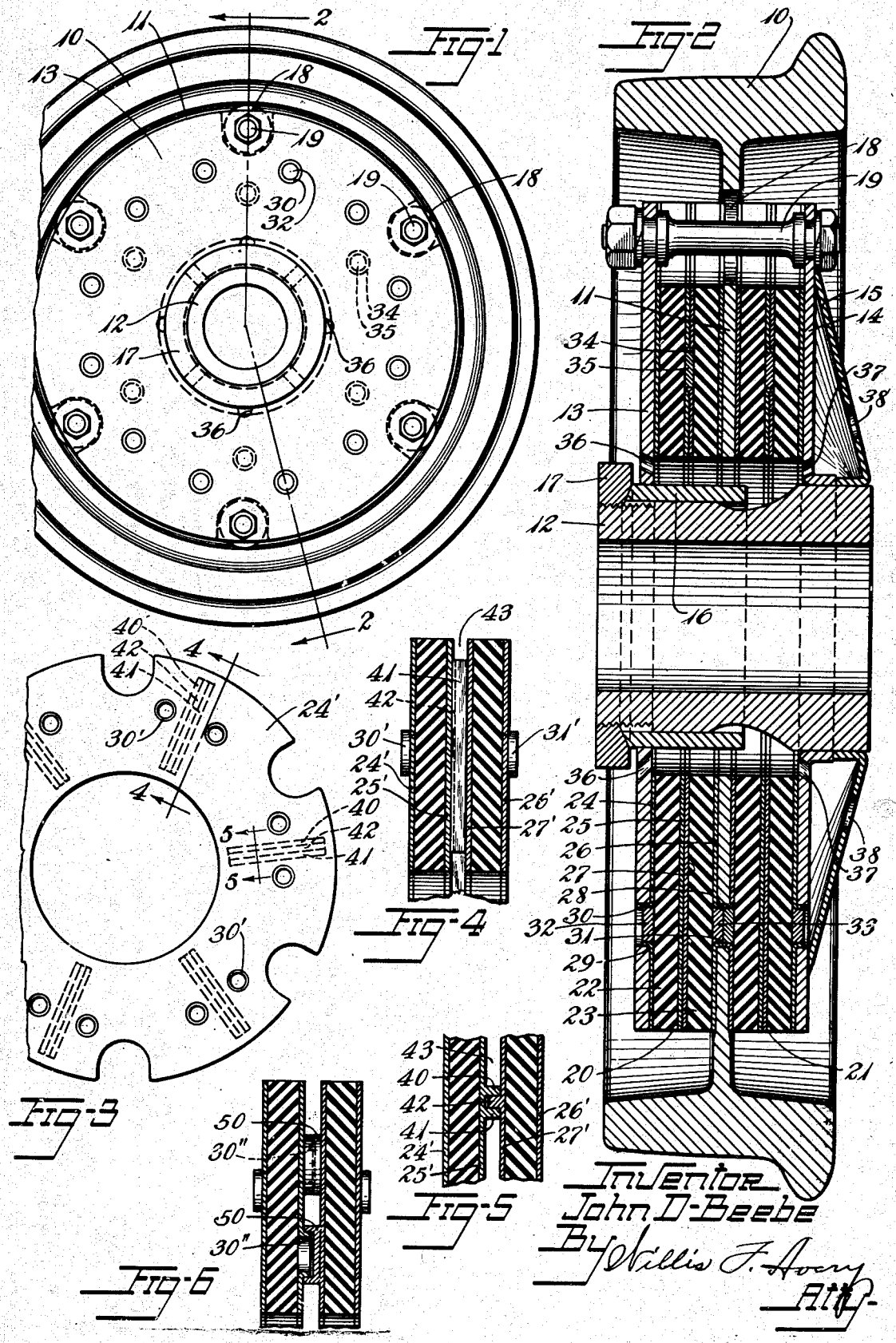
Inventor
John D. Beebe
By Willis F. Avery
Atty.

Patented Dec. 4, 1945

2,390,290

UNITED STATES PATENT OFFICE 2,390,290

RESILIENT WHEEL CUSHION

John D. Beebe, Silver Lake, Ohio, assignor to The B. F. Goodrich Company, New York, N. Y., a corporation of New York Application August 1, 1942, Serial No. 453,185

3 Claims. (Cl. 295—11)

This invention relates to cushion structures for resilient wheels, especially resilient rail wheels, although the invention is useful also in wheels for road vehicles and other types of vehicles.

It has been proposed heretofore to mount the cushion between overlapping radial extensions of the hub and rim for the purpose of reducing the effects of vibration and noise and improving the riding qualities of the wheel, the resilient cushion extending from one of such extensions to the other and being held in place by plates adhered to the cushion and detachably secured to the extensions.

It has been found desirable in some cases to alter the characteristics of the cushion by the addition of a further plate within the body of the cushion intermediate the attaching plates. However, the provision of such additional plate as an integral part of the cushion involves difficulties and inconvenience in manufacture, especially in the matter of locating it properly despite its floating character, and assuring a strong bond of attachment of the cushioning material to the plate.

The chief objects of this invention are to provide the advantages of an intermediate floating plate structure in the cushion while nevertheless avoiding the difficulties and inconveniences hereinabove referred to; to provide a cushion structure making for facility of manufacture, especially in the matter of locating the intermediate floating plate structure in an accurate manner and providing a strong bond of the cushion material thereto; to provide for effective ventilating action at the interior of the cushion structure, and to provide for convenience of assembly and disassembly and for economy of replacement in the event it is desired to replace only a portion of the cushion structure.

These and further objects will be apparent from the following description, reference being had to the accompanying drawing in which:

Fig. 1 is a side elevation of a resilient rail wheel constructed in accordance with and embodying the invention, parts being broken away.

Fig. 2 is a section on an enlarged scale taken along the line 2—2 of Fig. 1.

Fig. 3 is a side elevation of a modified cushion construction, parts being broken away.

Fig. 4 is a section on an enlarged scale, taken along the line 4—4 of Fig. 3.

Fig. 5 is a section on an enlarged scale taken along the line 5—5 of Fig. 3.

Fig. 6 is a view like Fig. 4 but showing a further modified construction.

With reference first to the embodiment of Figs. 1 and 2, the invention is here applied to a rail wheel comprising a rim portion 10 having a central radial extension 11, and a hub portion 12 having a pair of radial extensions 13, 14 overlapping the rim extension 11 in spaced relation thereto so as to accommodate intervening cushioning structures. The extension 14 may be secured to the hub as by welding and a reinforcing cone 15 may be secured to the hub and to the extension 14 at its outer face. The extension 13 may be secured to a sleeve 16 upon the hub as by welding, which sleeve and extension 13 may be urged axially toward the other extensions by means of a nut 17 threaded upon the hub and butting the end of the sleeve.

The rim extension 11 has a series of apertures 18—18 to receive bolts 19—19 which clamp the hub extensions 13, 14 at their outer peripheries and are free to move with relation to the rim as a result of the space provided by the apertures 18. The rim extension 11 at its inner periphery is spaced from the hub structure, and the hub extensions 13, 14 at their outer peripheries are spaced from the rim structure so that relative radial movement of the rim and hub structures is made possible as permitted by interposed cushioning structures. Cushioning structures 20, 21 may be identical and therefore only one need be described in detail. The cushioning structure 20 comprises a pair of annular disk-like bodies 22, 23 of resilient rubber or other rubber-like material. The body 22 has secured to its faces plates 24, 25, the attachment preferably being a vulcanized bond of the rubber-like material to the plates so that attachment of the cushion to the plates is able to resist vertical forces of deflection transmitted as shear stress in the rubber-like material and its attachment.

The other body 23 has annular plates 26, 27 secured to its faces also by a vulcanized bond. The outermost plates 24, 26 have means for detachably connecting the cushion structure to the respective rim and hub extensions 11 and 13, which may comprise dowels 28, 28 and 29, 29, which dowels are receivable in apertures in the extensions in a manner such that the plates lie flat against the extensions and are restrained against rotative and radial movements by the engagement of the dowels in the extensions. These dowels may be of any suitable construction and in the form shown in Figs. 1 and 2 comprise bent out circular portions 30, 31, which portions may be reinforced by inserted metal plugs 32, 33 secured in place as by welding to reinforce the metal of the plate and to provide a continuous inner surface of the plate to which the cushion material may be vulcanized.

The two inner plates 25 and 27, which are likewise bonded to their respective cushions, float in the cushion structure and are in mutual engagement for movement together. The engagement may be effected by dowels 34, 34 on one of these plates receivable in apertures in the other of said plates, which dowels may also be in the form of bent-out circular portions reinforced as by means of metal plugs 35, 35.

The arrangement is such that the two body portions 22, 23 of the cushion structure 20 with their respective plates are detachably engageable with the rim extension 11 and hub extension 13 of the wheel and with each other through the dowels 34, 34 at the inner plates 25, 27 which latter plates act together in a floating manner such that relative radial and rotative deflections of the rim and hub extensions are transmitted by shear stresses through the cushioning bodies 22 and 23 acting in series to provide cushioning effects resulting from such series arrangement as distinguished from a parallel arrangement.

The separable construction of the inner plates 25, 27 makes possible the internal floating plate structure and at the same time makes possible the manufacture of each cushion part with plates at its exposed faces, thus greatly facilitating the molding of the rubber-like material and the plates together under pressure while providing accurate location of the plates with respect to the rubber-like material and effecting a strong vulcanized bond. Also, each section of the cushioning structure may be of a standard size and shape so as to be interchangeable with other sections, and in the event of injury to one section it may be replaced without requiring replacement of the other section of the cushion.

I provide further for increasing ventilating action to reduce the effects of heat at the interior of the cushion resulting from rapidly repeated flexures, the separable nature of the plates 25, 27 facilitating the provision of passages between them for the flow of air. As is shown in the embodiment of Figs. 3, 4 and 5, the inner-most plates, indicated at 25', 27', may be engaged by means of radially directed ribs 40, 41 projecting axially from one of these plates in spaced relation with respect to each other to provide a space for receiving a third rib 42 projecting axially from the other plate, the arrangement being such that the ribs may be engaged by moving the two sections of the cushion structure toward each other in the axial direction to engage the ribs whereupon the plates will be held in a relation providing a space 43 between them. This space 43 preferably is left open to the inner and outer peripheries of the cushion structure so that air may flow through. This flow may be promoted also by the ventilation passages 36, 37 and 38 in the hub extensions and by the fact that the outer periphery of the cushions are open to the atmosphere.

In this embodiment, as in the previously described embodiment, the two sections of the cushion structure have outer plates 24' and 26' each of which is provided with dowels 30', 30', 31', 31', for securing the cushion structure to the hub and rim extensions.

In the embodiment of Fig. 6 the circular dowels 30'', 30'', instead of being received in apertures of the adjacent plate, may be received in cups 50, 50 attached as by welding to the other plate, in a manner such that the plates are held in an axially spaced-apart relation upon assembly providing ventilating passageway. For added strength of attachment two circumferentially spaced rows of the dowels 30'' and 30'' and cups 50, 50 may be provided at radially spaced positions. In this embodiment the circulation of air between the innermost plates is promoted both radially and circumferentially.

Variations may be made without departing from the scope of the invention as it is defined in the following claims.

I claim:

1. In a resilient wheel a cushion structure mounted between adjacent overlapping rim and hub extensions of the wheel, said cushion structure comprising a pair of elements of resilient rubber-like material, a pair of plates adhered to adjacent faces of said elements and supported thereby in a floating manner, and means between said plates interlocking the same for movement together and relative to both said rim and hub extensions, the interlocking means holding said plates in spaced-apart relation providing a ventilating passage between said plates.

2. In a resilient wheel a cushion structure mounted between adjacent overlapping rim and hub extensions of the wheel, said cushion structure comprising a pair of disc elements of resilient rubber-like material, a pair of plates adhered to adjacent faces of said elements and supported thereby in a floating manner, and means at circumferentially spaced positions between said plates interlocking the same for movement together and relative to both said rim and hub extensions, the interlocking means holding said plates in spaced-apart relation providing a ventilating passage between said plates.

3. A resilient wheel cushion structure for transmitting radial and torsional stresses between adjacent overlapping rim and hub extensions of the wheel, said cushion structure comprising two pairs of plates positionable side by side between said extensions, a cushion of resilient rubber-like material between each outermost plate and the adjacent innermost plate and adhered to both, means for securing the outermost plates to said extensions, and interengaging means on the opposing faces of the innermost plates to secure them for radial and torsional movement of said innermost plates together and relative to said outermost plates under wheel deflection, said interengaging means comprising projecting elements on both of said opposing faces of the innermost plates providing cooperating projections and recesses and separating said innermost plates to provide a ventilating space between them.

JOHN D. BEEBE.